United States Patent [19]
Negishi

[11] 3,787,823
[45] Jan. 22, 1974

[54] LIGHT CONTROLLABLE CHARGE TRANSFER DEVICE

[75] Inventor: Satoshi Negishi, Yokohama, Japan

[73] Assignee: Tokyo Shibaura Electric Co., Ltd., Saiwai-ku, Kawasaki-shi, Japan

[22] Filed: July 17, 1972

[21] Appl. No.: 272,721

[30] Foreign Application Priority Data

July 30, 1971 Japan ................................ 46-56780

[52] U.S. Cl. ... 340/173 LS, 250/213 R, 317/235 G, 317/235 N, 340/173 LT

[51] Int. Cl. ... G11c 11/34, G11c 9/00, G11c 11/42

[58] Field of Search .... 340/173 R, 173 LT, 173 LS; 317/235 G, 235 N; 250/213 R

[56] References Cited

UNITED STATES PATENTS

| | | | |
|---|---|---|---|
| 3,501,638 | 3/1970 | Compton | 250/213 R |
| 2,874,308 | 2/1959 | Livingston | 340/173 LS |
| 3,681,766 | 8/1972 | Chapman | 340/173 LM |
| 2,905,830 | 9/1959 | Kazan | 340/173 LS |
| 3,704,376 | 11/1972 | Lehovec | 317/235 G |

OTHER PUBLICATIONS

Altman, The New Concept for Memory and Imaging: Charge Coupling, Electronics, June 21, 1971, pp. 50–59.

Kosanke, Optical Information Transfer System, IBM Technical Disclosure Bulletin, Vol. 9, No. 8, 1/67, pp. 997–998.

*Primary Examiner*—Daryl W. Cook
*Assistant Examiner*—Stuart Hecker
*Attorney, Agent, or Firm*—Flynn & Frishauf

[57] ABSTRACT

A light controllable charge transfer device wherein one surface of a monolithic semiconductor substrate is coated with a photoelectric conductive layer whose surface is covered with a transparent electrode; a bias voltage is applied across the transparent electrode and the opposite surface of said semiconductor substrate; and control light consisting of holding beams and transferring beams, after being introduced, is moved along the surface of the photoelectric conductive layer through said transparent electrode so as to form depletion layers in the semiconductor substrate for storing charged carriers representing bit information.

7 Claims, 18 Drawing Figures

LIGHT CONTROLLABLE CHARGE TRANSFER DEVICE

BACKGROUND OF THE INVENTION

This invention relates to a charge coupled device and more particularly to a light controllable charge transfer device.

A charge coupled device is generally intended to store and transfer information by having a depletion layer formed in the surface of a monolithic semiconductor substrate, storing information representing the presence or absence of minority carriers in said depletion layer; and shifting said information along the semiconductor substrate by the transfer of said depletion layer. Formation of said depletion layer in the surface of the semiconductor substrate has heretofore been effected by a charge coupled device of the MOS (metal-oxide-semiconductor) or MIS (metal-insulator-semiconductor) type. Namely, the conventional charge coupled device is constructed by mounting a metal electrode layer on the surface of the semiconductor substrate with an oxide or insulator layer sndwiched therebetween. Thus, application of bias voltage across the semiconductor substrate and electrode causes a depletion layer to be formed in the semiconductor substrate right under the metal electrode. The larger the absolute value of the bias voltage, the thicker the depletion layer, that is, the deeper the voltage well in the semiconductor substrate.

With the prior art charge coupled device of the abovementioned construction, transfer of information representing the presence or absence of minority carriers has to be effected by impressing different levels of voltage on a plurality of metal electrodes in succession. To this end, there have to be provided on the surface of the semiconductor substrate a great many separate metal electrodes and lead-out lines thereof, presenting difficulties in manufacturing said device. Further, successive impression of different levels of voltage is carried out through complicated circuitry, rendering said device unadapted for practical application.

It is accordingly the object of this invention to provide a light controllable charge transfer device of simple construction which enables the storage and transfer of charged carriers to be controlled by light.

SUMMARY OF THE INVENTION

According to this invention, there is provided a light controllable charge transfer device comprising a monolithic semiconductor substrate for storing charge carriers representing bit information; an insulating layer formed on one surface of said monolithic semiconductor substrate; a photoelectric conductive layer provided on the surface of said insulating layer; a transparent electrode deposited on the surface of said photoelectric conductive layer; and means for applying bias voltage across said monolithic semiconductor substrate and transparent electrode to form depletion layers in said monolithic semiconductor substrate by introducing control light comprising holding beams and transferring beams moving along the surface of said photoelectric conductive layer through said transparent electrode.

DESCRIPTION OF THE PREFERRED EMBODIMENTS

Figure 1:
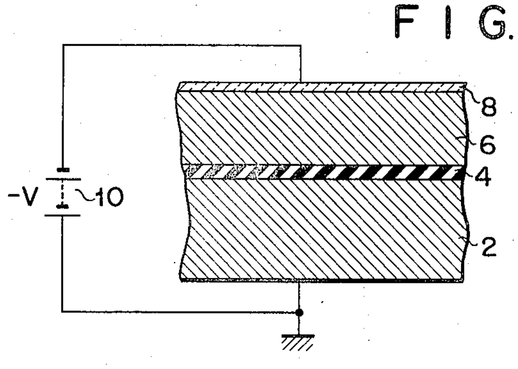
FIG. 1 is a schematic fractional cross sectional view of a light controllable charge transfer device according to an embodiment of this invention.

Referring to FIG. 1, there is formed a silicon oxide layer 4 as an insulation material on one surface of a silicon substrate 2, for example, of N type. Further on said silicon oxide layer 4 is deposited, for example, a layer 6 of photoelectric conductive cadmium selenide (CdSe). On said cadmium selenide layer is mounted a transparent electrode 8, which may consist of the known NESA film. As used herein, the term "transparent electrode" is defined to mean a type permeable not only to visible beams of light but also invisible radiation.

Between the opposite or noncoated surface of the silicon substrate 2 and the transparent electrode 8 is connected a D.C. bias source 10 so as to render the electrode 8 negative relative to the silicon substrate 2. Into the photoelectric conductive layer 6 is introduced from a light source (not shown) through the transparent electrode 8 control light consisting of holding beams and transferring beams moving along the surface of the photoelectric conductive layer 6.

Figure 2A:
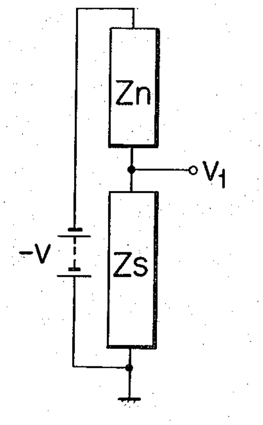
FIG. 2A is a schematic circuit arrangement of the device of FIG. 1 showing the distribution of impedance therein where there is not introduced any light.
Figure 3:
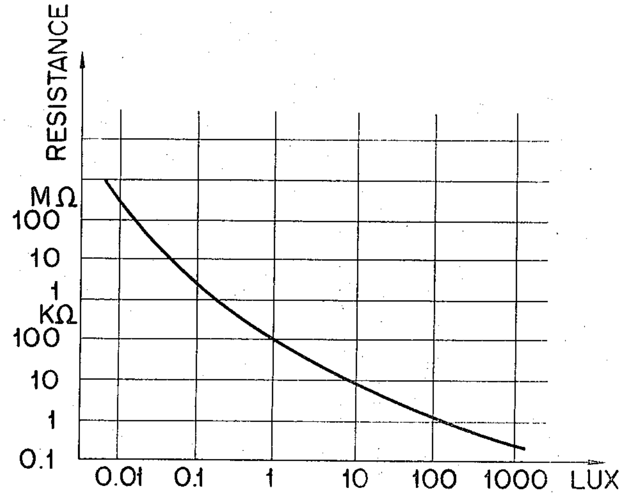
FIG. 3 is a curve diagram indicating the relationship of the intensity of illumination applied to a photoelectric conductive material included in the charge transfer device of this invention and resultant variations in the resistance of said device.

Generaly, a photoelectric conductive material has its electric conductivity varied as much as $10^4$ to $10^5$ between when illuminated and when not illuminated. A photoelectric conductive material which has a drak resistance of 100 MΩ when not exposed to light indicates, as shown in FIG. 3, an illumination resistance of about 5 KΩ when a certain amount of light falls thereon. Now let the impedance be designated as Zs which prevails across the interface between the silicon oxide layer 4 and cadmium selenide layer 6 and the positive terminal of the power source 10 when the charge transfer device is not illuminated, and the impedance as Zn which occurs across said interface and the negative terminal of the power source 10. This means that as shown in FIG. 2A, there are connected in series two impedances Zn and Zs to the power source 10. In this case, the impedance Zs, that is, the voltage $V_1$ impressed across said interface and the underside of the silicon substrate 2 may be expressed as $$V_1 = (-Zs)/(Zs + Zn)\ V \qquad (1)$$

where V is the voltage of the power source 10.

Figure 2B:
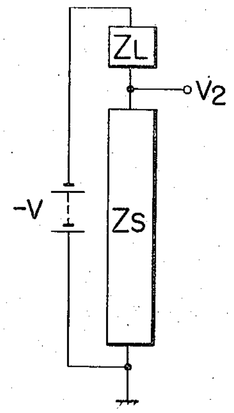
FIG. 2B is a schematic circuit arrangement of the device of FIG. 1 showing the distribution of impedance therein where there is introduced a light.

Conversely where the charge transfer device is exposed to light, the impedance in the cadmium selenide layer 6 falls, as described above, down to the order of KΩ. With said reduced impedance represented by ZL, this condition may be deemed equal to that in which the impedances ZL and Zs are connected in series as shown in FIG. 2B. Accordingly, the voltage $V_2$ associated with the impedance Zs may be indicated as $$V_2 = (-Zs)/(Zs + ZL)\ V \qquad (2)$$

From the above equations (1) and (2) there results the following equation:

$$\begin{aligned} V_1 - V_2 &= Zs \cdot V[(1/(Zs + Zn) - 1/(Zs + ZL)] \\ &= Zs \cdot V \cdot (ZL - Zn)/[(Zs + Zn)(Zs + ZL)] \end{aligned} \qquad (3)$$

Since $Zn = 10^{4\ to\ 5} ZL$ as previously mentioned, there results $ZL - Zn << 0$, namely, $V_1 << V_2$. Thus, when the charge transfer device receives light, there is impressed far higher voltage across the surface of the silicon oxide layer 4 and the underside of the silicon substrate 2. The higher said voltage, the thicker the depletion layer grown in the silicon substrate 2 right under the silicon oxide layer 4, and in consequence the larger the amount of light brought to the cadmium selenide layer 6, the thicker the depletion layer. The charge transfer device of this invention is designed to form in the silicon substrate 2 a depletion layer having a thickness corresponding to the controlled amount of light introduced into the cadmium selenide layer 6, and transfer minority carriers previously received in said depletion layer to another depletion storage therein.

Figure 4A:
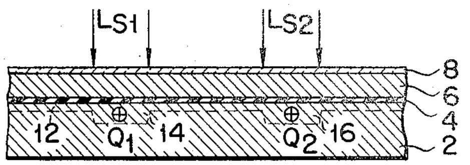
FIGS. 4A to 4E illustrate the operation of the device of FIG. 1.

There will now be described by reference to FIG. 4 the manner in which the charge transfer device of FIG. 1 stores and transfers minority carriers. Throughout FIGS. 4A to 4E, let it be assumed that the bias source (not shown) is connected in the same manner as in FIG. 1. Referring to FIG. 4A, when carrier storing light Ls enters the photoelectric conductive layer 6 through the transparent electrode 8, then the impedance in the region of light incidence falls to cause the corresponding portion of a depletion layer 12 to grow thick or deep. Where, under this condition, there arrives information light, for example, from below the silicon substrate 2, then there are generated within the silicon substrate 2, for example, of N type a large number of electrons and holes. The latter holes, that is, minority carriers $Q_1$ and $Q_2$ are stored in the deep wells 14 and 16 respectively of the depletion layer 12.

Figure 4B:
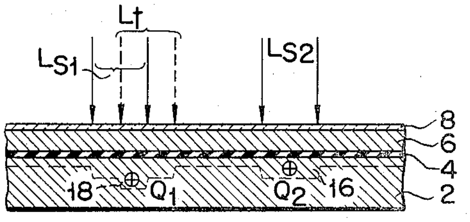
Figure 4C:
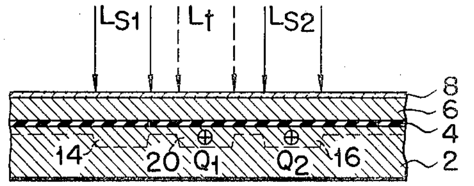
Figure 4D:
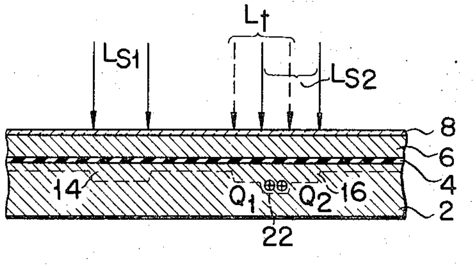
Figure 4E:
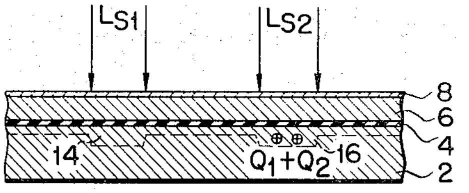

For transfer of charged carriers $Q_1$ stored in the well 14 to the well 16, there is first introduced transferring light Lt, as shown in FIG. 4B, with part thereof superposed on the carrier storing light Ls received in the well 14. Therefore, in the region of the device where the storing light Ls and transferring light Lt are superposed, the depletion layer grows deeper than in the other regions, and as the result, the minority carriers $Q_1$ stored in the well 14 fall into the well 18 (FIG. 4B) now grown deeper than the well 16. Said well 18 is shifted together with the carriers $Q_1$ toward the well 16 as the result of the travel of the transferring light Lt in said direction. When the transferring light Lt is brought, as shown in FIG. 4C, to an intermediate point between the wells 14 and 16, then the carriers $Q_1$ are removed from the well 14 to be held in a new well 20 created by the transferring light Lt and then forwarded toward the well 16. Upon further movement, the transferring light Lt partly overlaps the storing light $Ls_2$ as shown in FIG. 4D. Accordingly, the carriers $Q_1$, together with carriers $Q_2$, fall into a new well 22 formed due to the superposition of the transferring and storing lights Lt and $Ls_2$. Upon extinction of the transferring light Lt, the carriers $Q_1$ and $Q_2$ are held, as indicated in FIG. 4E, in the well 16 already created by the storing light $Ls_2$. This completes transfer of the carriers $Q_1$ from the well 14 to the well 16 by means of control light alone.

As apparent from the foregoing description, the light controllable charge transfer device of this invention effects the storage and transfer of carriers by control light instead of by the adjustment of voltage which the prior art device employed in storing and transferring said carriers. Therefore, the device of this invention eliminates the necessity of using control lines required for the conventional device, facilitating manufacture and increasing bit density.

For the device of this invention utilizing such a novel method of transferring carriers, there may be contemplated various modifications. There will now be described some of these modifications and applications thereof by reference to a number of factors associated therewith.

Photoelectric Material

The device of FIG. 1 including cadmium selenide, but permits the use of polysilicon instead. Particularly, application of polysilicon which is of the same material as the silicon substrate offers various advantages in manufacturing technique, including the simplification of an apparatus for producing the subject charge transfer device.

Logical Function of Control Light

As seen from FIG. 3, the larger the illumination emitted to a charge transfer device, the smaller the resistance presented by a photoelectric conductive material included therein. When the photoelectric conductive material has its resistance R reduced upon exposure to light to a sufficiently lower level than a threshold value Rth to control a charge transfer device, then said device can perform a logical function, as described below, upon receipt of control light. Now let the resistance be designated as $R_i$ which results from introduction of a unit amount of control light. In this case, the resistance $R_1$ is greater than the threshold resistance Rth, so that said amount of light still provides insufficient illumination for control of the charge transfer device. If, however, light beams emitted from a plurality (for example, a number of n) of light sources are simultaneously directed to the same spot on a photoelectric conductive material, then the illumination on said spot will have an intensity n times that of the unit illumination, causing the resistance of the photoelectric conductive material to decrease from $R_1$ to Rn. If, in this case, there results $R_1 > Rth > Rn$, then it will be possible to control the charge transfer device. Thus, this device can carry out a logical function of judging whether or not the resistance of the photoelectric conductive material falls below the threshold level upon receipt of all illumination obtained by supplying the device from a plurality of light sources simultaneously with control light beams, each of which is chosen to have a higher intensity than the minimum unit illumination. Further, said device can effect a logical function either by varying the intensity of control light emitted from a single light source or combining both processes of adjusting the amount of illumination.

Adjustment of Bias Voltage

The foregoing description refers to the case where the bias voltage and in consequence the threshold resistance Rth of the photoelectric material were fixed. Obviously, however, variation of the bias voltage leads to change of the threshold voltage Rth. This fact can be utilized, for example, in the undermentioned function carried out by the charge transfer device of this invention. Referring to FIG. 2B, let it be assumed that the bias voltage −V is equal to −Va and that the impedance ZL when control light is emitted to the charge transfer device in an n number of unit amounts has a value of ZLn. Then the voltage $V_{2a}$ associated with the impedance Zs may be expressed as $$V_{2a} = -Zs/(Zs + ZLn)\cdot Va > -Vth \quad (4)$$

where −Vth denotes a threshold value of voltage. Under the condition represented by the equation (4) above, it is impossible to control the charge transfer device. Where the bias voltage −V changes from the value prevailing under said condition to a value of −Vb(where |Va < Vb|), the voltage $V_{2b}$ associated with the impedance Zs may be indicated as $$V_{2b} = [Zs/(Zs + ZLn)]\cdot Vb < -Vth \quad (5)$$

Then the charge transfer device can be controlled, provided Va, Vb and Vth have the relationships denoted by the following equations (6) and (7) derived from the above equations (4) and (5).

As seen from the foregoing description, the charge transfer device can be controlled by proper adjustment of the bias voltage combined with introduction of a certain amount of control light. Said control can obviously be attained by varying both the bias voltage and the amount of control light.

Surface Supplied with Information Light and Control Light

The foregoing description refers to the case where information light was supplied to the charge transfer device from below the silicon substrate 2. To this end, the prior art device required the silicon substrate to be ground sufficiently thin. If, however, the substrate consists of silicon superposed on sapphire having a similar crystalline structure to that of silicon, that is, the so-called SOS (silicon on sapphire) construction, then it will be possible to introduce much larger amounts of information light into the substrate from its underside, even without thinning the silicon layer. In this case, the energy of information light is absorbed in the silicon in the form of carriers, independently of variations in the resistance of a photoelectric conductive material caused by introduction of control light.

There will now be described the case where information light is supplied to the silicon substrate from the side of the photoelectric conductive material. In this case, it is assumed that silicon, cadmium sulfide and cadmium selenide have forbidden band widths of 1.1 eV, 2.4 eV and 1.8 eV respectively. On the other hand, the energy E of a light quantum is indicated as E: 12395/λ(A) eV, so that light wave lengths corresponding to the aforesaid forbidden band widths of silicon, cadmium sulfide and cadmium selenide are 11268A, 5164.6A and 6886.1A. If, therefore, information light has a wave length approximating 11268A, then it can be absorbed in the silicon in the form of carriers and permeate a photoelectric conductive material such as cadmium sulfide or cadmium selenide because of such a great wave length. On the other hand, if there is emitted control light having a wave length of about 5164.6A in case the photoelectric conductive material consists of cadmium salfide and a wave length of about 6886.1 A in case said material is formed of cadmium selenide, then transfer of carriers through a silicon substrate can be better controlled. The reason is that control light having such a short wave length is absorbed in the cadmium sulfide or cadmium selenide and prevented from reaching the silicon and in consequence exerting any effect on the carriers received therein. The charge transfer device of this invention uses information light and control light having different wave lengths as described above, enabling both types of light to be selectively emitted to a prescribed spot from the same side to simplify manufacture.

Combined Use of Voltage and Light as Control Means

Figure 5A:
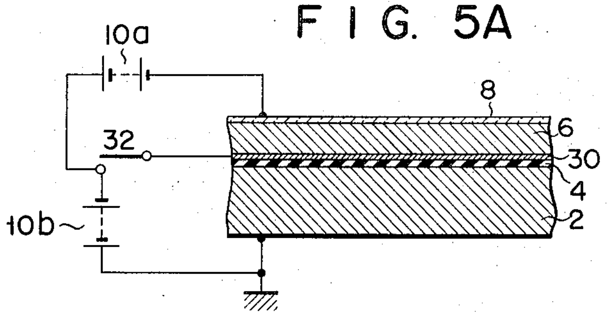
FIG. 5A is a schematic fractional cross sectional view of a charge transfer device according to another embodiment of the invention.
Figure 5B:
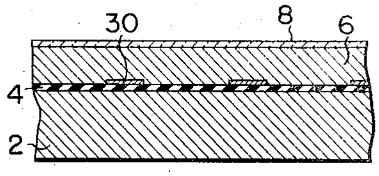
FIG. 5B is a cross sectional view of the device of FIG. 5A as taken in a direction perpendicular to the connection line of the control electrode of said device.

FIGS. 5A and 5B jointly illustrate a charge transfer device according to this invention using said combination system. The parts of FIGS. 5A and 5B the same as those of FIG. 1 are denoted by the same numbers. According to the embodiment of FIG. 5 there are disposed a plurality of control electrodes 30 between the insulation layer 4 and photoelectric conductive layer 6 of FIG. 1. Between the silicon substrate 2 and transparent electrode 8 are connected two bias voltage sources **10*a* and 10*b* whose contacts are selectively connected to the control electrodes 30 by a switch 32. The control electrodes 30 are so connected as to be all rendered equipotential. Referring to FIG. 5A, when the switch 32 is turned off, the charge transfer device can be controlled by control light alone. When the switch 32 is turned on, the depletion layer grown in the silicon substrate 2 has its thickness determined only by the magnitude of the bias voltage supplied from the source 10*b***. In this case, control of the charge transfer device is effected independently of control light.

Accordingly, the charge transfer device can also carry out the aforementioned logical function by varying the voltage of the bias voltage sources **10*a* and 10*b*. The foregoing description refers to the case where there are collectively controlled a plurality of bits. If, however, there are provided the same number of switches 32** as the bits so as to face each other, than the charge transfer device can be controlled more efficiently either optically or electrically, that is, by a process best suited for a given occasion, thereby elevating its logical function.

Limitation of the Carrier Storing Region of a Photoelectric Conductive Material by the Size of a Bit There are generally raised two problems when control light is emitted to a photoelectric conductive material. One is concerned with the relationship between the size of a bit and that of a control light spot and the other with the blurring of the periphery of that region of a photoelectric conductive material where its resistance varies upon receipt of light. The former obstructs the elevation of bit density and the latter obliterates the outline of that region of the photoelectric conductive material where carriers are stored, in case their transfer therefrom is to be controlled. Means for eliminating such difficulties consists in, for example, forming grid-like opaque portions 34 as indicated by the hatched or shaded bands of FIG. 6A on the surface of a transparent electrode 8 and causing only that part of a circular spot control light 36 shown by way of illustration only in one of the square regions defined by said hatched bands which is surrounded with the lines bearing the letters *a*, *b*, *c* and *d* to be brought into the photoelectric conductive material. In practice, the circular spot control light 36 is made to pass through all the aforesaid square regions under the aforesaid limited condition. Accordingly, even if the center of incoming circular spot control light is displaced from the center of the abovementioned square regions or the spot size changes, it will not lead to any irregular variation in the resistance of the photoelectric conductive material. If the opaque portions 34 are formed with a width of less than several microns, it will not substantially obstruct the transfer of carriers. Said opaque portions 34 can be easily provided by vapor deposition of metal such as aluminum, gold or molybdenum in grid form on the surface of a transparent electrode consisting of, for example, a NESA film coated on the photoelectric conductive material.

Figure 6A:
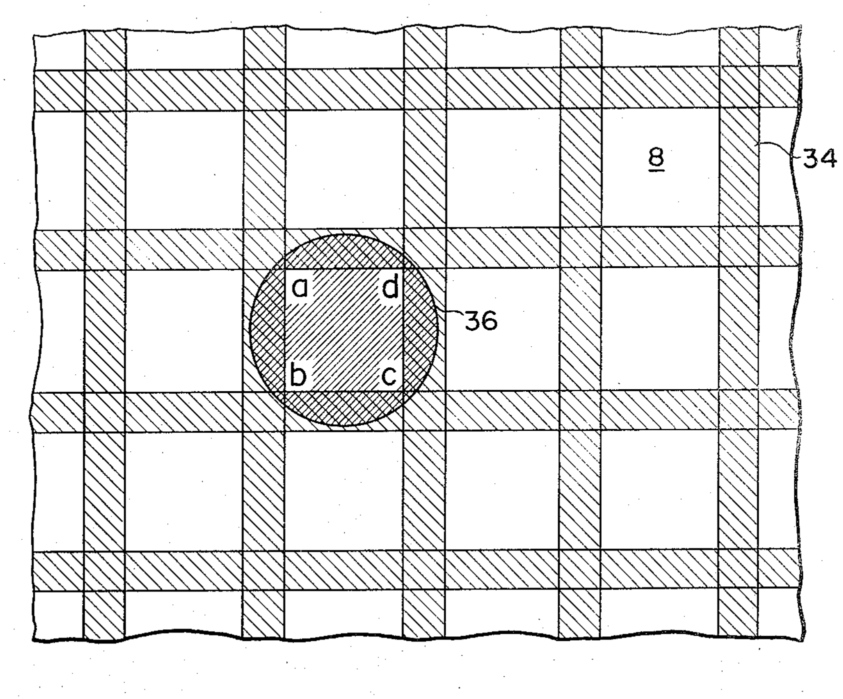
FIG. 6A is a plan view of a modification of the device of FIG. 1.
Figure 6B:
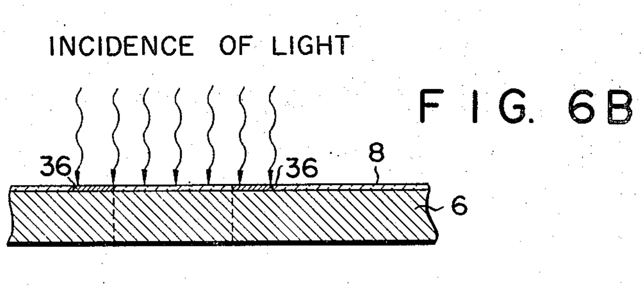
FIG. 6B is a fractional cross sectional view of the device of FIG. 6A.
Figure 7:
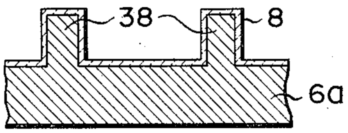
FIG. 7 illustrates the construction of a photoelectric conductive material included in another modification of the device of FIG. 1.

FIG. 7 illustrates a plurality of projections 38 corresponding to the opaque portions 34 of FIG. 6A which are integrally formed with the photoelectric conductive layer 6a disposed under the transparent electrode 8. Said projections 38 are each preferred to have a height almost equal to the thickness of the photoelectric conductive layer 6a and a width of less than several microns like that of the opaque portions 34 of FIG. 6A. These projections 38 have substantially the same effect of shutting off light as the opaque portions 34 of FIG. 6A.

A Charge Transfer Device Combined with a Fly's Eye Lens

Figure 8A:
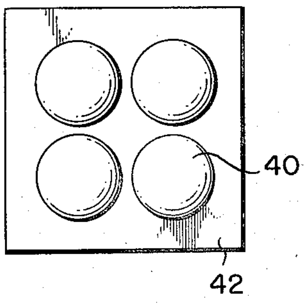
FIG. 8A is a plan view of a fly's eye lens used with the device of the invention.
Figure 8B:
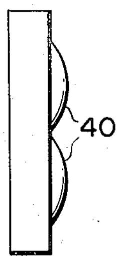
FIG. 8B is a side view of said lens.
Figure 9:
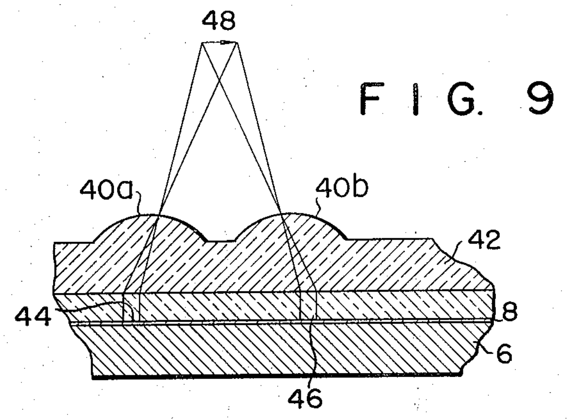
FIG. 9 is a cross sectional view of the device of the invention fitted with the fly's eye lens of FIGS. 8A and 8B.
Figure 10:
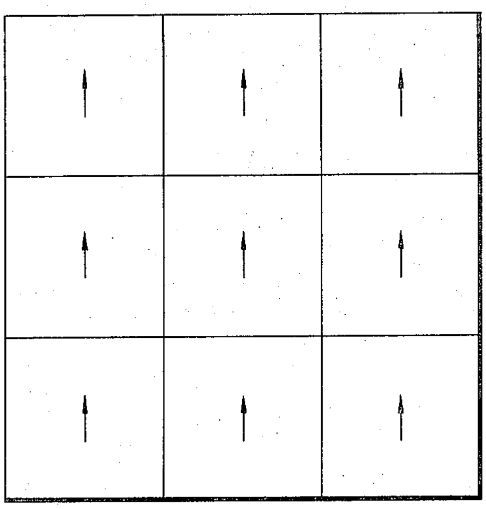
FIG. 10 presents nine equal input light information patterns simultaneously formed on the device of the invention, using a fly's eye lens consisting of nine unit elements.

The fly's eye lens 42, as used herein, represents, as illustrated in FIGS. 8A and 8B, an integral arrangement of a plurality of unit lenses 40 having substantially the same optical properties. Where said fly's eye lens 42 is placed between a foreground subject and an image pickup plane, there are formed the images of the foreground subject in the same number as the unit lenses 40 on the image pickup plane. For utilization of the above-mentioned property of the fly's eye lens, it is mounted, as illustrated in FIG. 9, on the transparent electrode 8 of the charge transfer device of FIG. 1 so as to pick up the image of a foreground subject on the electrode 8. When focused by a unit element **40*a* of the fly's eye lens 42, said image is directed to a spot 44 on the electrode 8 and, when concentrated by a unit element 40*b* of said lens 42, to a spot 46 on said electrode 8. Accordingly, there is obtained the same pattern as an illuminated foreground subject 48 in an equal number to that of the unit elements of the fly's eye lens 42. When the above-mentioned property of said lens 42 is applied in introducing an input light, there are formed as shown in FIG. 10**, nine equal patterns to that of the illuminated foreground subject. Thus, light information can be treated by a very quick simultaneous parallel operations of a single device, offering great practical advantage.

Further, employment of the fly's eye lens in emission of control light enables previously stored two-dimensional light information images bearing different contents to be treated simultaneously in the same manner.

What is claimed is:

1. A light controllable charge transfer device comprising:

a monolithic semiconductor substrate for storing charge carriers representing bit information;

an insulating layer formed on one surface of said monolithic semiconductor substrate;

a photoelectric conductive layer deposited on the surface of said insulating layer;

a transparent electrode mounted on the surface of said photoelectric conductive layer;

means for applying bias voltage across said monolithic semiconductor substrate and said transparent electrode;

a source of first light for introducing carrier storing light to said photoelectric conductive layer through said transparent electrode to form in said monolithic semiconductor substrate at least one first well of depletion layers in which carriers are charged; and a source of second light for introducing transferring light to said photoelectric conductor layer through said transparent electrode to form in said monolithic semiconductor substrate a second well of a depletion layer partly superposed on said first well and having a depth at least as deep as said first well, said transferring light being shiftable along the surface of said photoelectric conductive layer to transfer said charged carriers.

2. The charge transfer device according to claim 1 wherein said device further comprises a plurality of control electrodes provided between said insulating layer and said photoelectric conductive layer and means for selectively applying bias voltage across the opposite surface of said substrate and said transparent electrode as well as across the opposite surface of said substrate and said control electrodes.

3. The charge transfer device according to claim 1 comprising grid-like opaque portions formed on the transparent electrode, said grid-like opaque portions defining a plurality of transparent regions each corresponding to the carriers stored in the semiconductor substrate.

4. The charge transfer device according to claim 3 wherein said grid-like opaque portions comprise depositing conductive metal layers deposited on the transparent electrode.

5. The charge transfer device according to claim 1 wherein said photoelectric conductive layer includes raised grid-like portions defining a plurality of recessions, each corresponding to the carriers stored in the semiconductor substrate.

6. The charge transfer device according to claim 1 further comprising a fly's eye lens fitted on the surface of said transparent electrode, said fly's eye lens having a plurality of unit elements, each of which focuses a source light on the transparent electrode.

7. The charge transfer device according to claim 1 wherein said bit information is provided by information light, and wherein said carrier storing light and transferring light have different wave lengths than said information light.

* * * * *

UNITED STATES PATENT OFFICE
CERTIFICATE OF CORRECTION

Patent No. 3,787,823 Dated January 22, 1974

Inventor(s) Satoshi NEGISHI

It is certified that error appears in the above-identified patent and that said Letters Patent are hereby corrected as shown below:

Column 9, lines 12 and 13, delete "depositing".

Signed and sealed this 3rd day of September 1974.

(SEAL)
Attest:

McCOY M. GIBSON, JR.
Attesting Officer

C. MARSHALL DANN
Commissioner of Patents